United States Patent

[11] 3,602,090

[72] Inventor William J. Whetham
 Seattle, Wash.
[21] Appl. No. 15,043
[22] Filed Feb. 27, 1970
[45] Patented Aug. 31, 1971
[73] Assignee The Boeing Company
 Seattle, Wash.

[54] MILLING MACHINE CONTROL SYSTEM AND MILLING FORCE SENSOR THEREFOR
 10 Claims, 8 Drawing Figs.
[52] U.S. Cl. ................................................. 90/11 A,
 90/13 C, 318/571
[51] Int. Cl. ............................................... B23c 1/16
[50] Field of Search ........................................ 90/13 R, 13
 C, 11 R, 11 A; 318/38, 571

[56] References Cited
 UNITED STATES PATENTS
3,259,023 7/1966 Rieger et al .................. 90/13.5

Primary Examiner—Gerald A. Dost
Attorney—Christensen, Sanborn & Matthews

ABSTRACT: An improved force sensor useful in automatic feedrate control systems for milling machines which utilize a single input variable. The sensor includes a plurality of magnetic transducers which are disposed about the periphery of a portion of the machine spindle. The transducer primaries are provided with an AC exciting voltage and the secondaries are connected in opposition so that the common output signal therefrom has a zero DC content under conditions of zero spindle loading. When a sideload or end load is supplied to the cutting tool, and thus to the spindle, during the milling process, the common output signal principally comprises an AC component which is amplitude modulated in proportion to the degree if spindle deflection. A demodulator converts the amplitude modulated component into a DC signal representative of milling force. This signal is then supplied to a controller in the feedrate system. A modification of such controllers is also taught which compensates for undue cutting element wear due to high preset feedrates. This improved controller reduces the actual feedrate to a value equal to one-half of that preset when the cutting element first engages the workpiece.

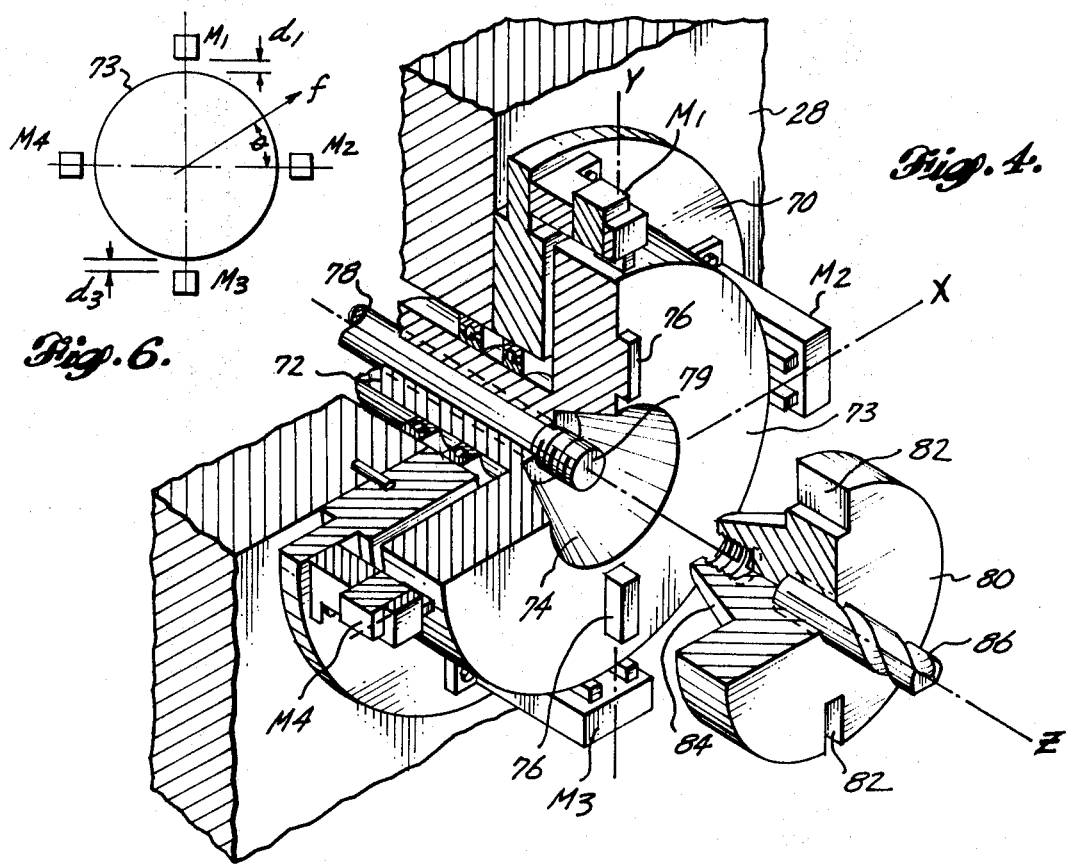
Fig. 4.
Fig. 6.
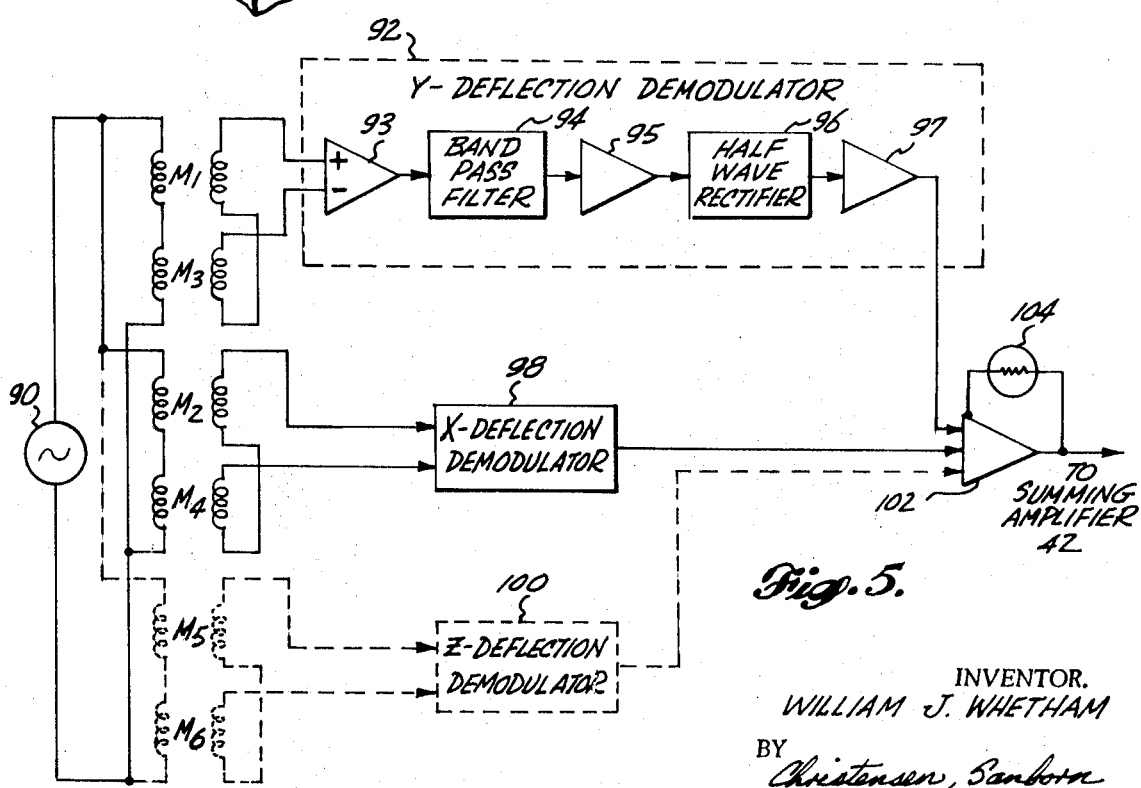
Fig. 5.
INVENTOR.
WILLIAM J. WHETHAM

INVENTOR.
WILLIAM J. WHETHAM
BY Christensen, Sanborn & Matthews
ATTORNEYS

MILLING MACHINE CONTROL SYSTEM AND MILLING FORCE SENSOR THEREFOR

BACKGROUND OF THE INVENTION

This invention generally relates to systems for automatically controlling milling machines, and, more particularly, to an improved controller and milling force sensor for such systems.

In a machine tool such a milling machine, metal removal is accomplished by rotating a cutting tool at a predetermined rate against a workpiece that is moved at a predetermined feedrate relative to the cutting tool. With particular references to FIG. 1, a milling machine 10 of the conventional horizontal bed mill type includes a longitudinal base 12 upon which are disposed two rails 14. A milling table 16 supports a workpiece 18 and is moved in a longitudinal or X-direction, along rails 14 by a suitable table motor and gears, not shown, which are housed in a casing 20. Disposed at a right angle to the rails 14 are a pair of rails 22 which may be supported by casing 20. A second table 24 is disposed on rails 22 and is moved in a vertical or Y-direction, by a second motor and gear arrangement disposed in housing 20. In turn, table 24 has a pair of rails 26 mounted thereon. A cutter mechanism 28 is disposed on rails 26 and is moved in a transverse or Z-direction by a third motor and gear arrangement, preferably within cutter mechanism 28. Mechanism 28 also houses a fourth motor and gear arrangement which rotates a spindle extending in the Z-direction and terminating through various adapters, in a cutting tool 30 which is brought into engagement with the workpiece 18 during the milling process. With machines of this type, the term "feedrate" can be defined as the rate of movement of the workpiece 18 relative to cutting tool 30 in any of the three coordinate directions, as by movements of tables 18 or 24 or cutter mechanism 28.

In the past, standard milling practice has dictated that the machine operator select or maintain a feedrate of the workpiece relative to the cutting tool that is a compromise between the need for maximum metal removal from the workpiece in the shortest possible time, and avoidance of undue cutter breakage or wear. In such cases, the operator would depend on his own experience and caution in setting a feedrate. With the advent of numerically controlled milling machines, the operations of the various table and spindle mechanisms are under direct control of a digital computer which receives its input from a data source, such as punched paper tape or a magnetic tape. Although knowledge of the milling process has advanced to a point where these systems control most aspects thereof, the relationship between cutter breakage and wear and maximum metal removal from the workpiece has not been completely understood. Accordingly, the selection of feedrate for a particular operation, with particular metals, is still largely determined by the experience and caution of the operator. With these systems, a desired feedrate is preset into the numerical control unit by the operator, either manually or by means of the preprogrammed input tape. In addition, a manual override circuit is usually provided which includes an operator controlled potentiometer. When a situation of potential undue wear or stress is encountered, the operator can manipulate this control to reduce the preset feedrate.

Although feedrate selection by the machine operator does minimize cutter breakage and wear, this selection has often proved to be very conservative with respect to an optimum balance between those factors and maximum machine productivity. Since milling machines are generally very expensive devices to purchase and operate, every increase of productivity thereof is desirable. Recognizing this problem, many experiments have devised automatic control systems for feedrate. For the most part, these systems have been integrated with the numerical control circuitry and have determined an optimum feedrate from a plurality of parameters of the machining process. For example, one approach has been to measure the spindle axial load by hydraulic means connected thereto, and to provide an appropriate step reduction in the feedrate when that load exceeds a predetermined minimum. Another approach found in many prior devices has been to sense the torque output and speed of the electric motor which drives either the feed table or the spindle, and to modify the preset feedrate in proportion thereto. Still another approach has been to measure, by means of suitable sensors, the deflection of the cutting tool and the torque exerted thereon by engagement with the workpiece, and to accordingly control the operation of the spindle motor and the feed table motor simultaneously in proportion to a control signal obtained by combining the deflection and torque information.

Although these prior approaches do provide automatic control of feedrate, they have been very expensive to implement. In addition, the specific designs advanced have not been adapted or made available for use with any numerically controlled or conventional milling machine. Yet, there are many machines, in which there has been placed large capital expenditures, whose productivity could be greatly increased by a feedrate control system.

An inexpensive feedrate control system which has been experimentally shown to provide a large reduction in machining time from that encountered with manual feedrate control is described and claimed in a copending patent application Ser. No. 14,918 entitled "FEEDRATE SYSTEM FOR MILLING MACHINES," by Lyle C. Adams, and which is assigned to the assignee of the present invention. While that application should be referred to for complete system details, it may be briefly noted that feedrate is controlled therein by comparing a preset reference force signal with a milling force signal derived from a single parameter of the machine spindle, such as deflection or torque.

This system requires virtually no modification of the milling machine to which it is fitted and is therefore adaptable to many existing machines. In one mode, the system allows sensing of deflection or torque by a sensor housing interposed between the spindle and the cutting element. Included in the sensor housing is a spindle adapter which rotates with the spindle and cutting element and which has located on its surface a plurality of strain gauges which are connected in a suitable DC bridge. The bridge outputs are coupled to the remainder of the control system by a slipring arrangement.

Such an apparatus for detecting a spindle parameter, although providing an acceptable input signal to the remaining elements of the system, is relatively expensive because of the sturdiness required to ensure force transmission between the spindle and the cutting element. As with all mechanical contacts of this type, signal transmission is sometimes intermittent and unreliable. Finally, the space that the sensor housing takes at the cutting head reduces the volume available for machining operations.

This problem of obtaining suitable signals representative of spindle deflection is also common to prior feedrate and other control systems using that quality as one control parameter. The advantages of such systems have often been offset by the limitations inherent in a mechanical arrangement such as a strain gauge or a pressure transducer.

It is therefore an object of this invention to provide an improved deflection sensor for milling machine control systems which is inexpensive, which provides reliable noncontact coupling of deflection signals to the system, and which is relatively compact.

It is a further object of this invention to provide an improved controller for such an automatic feedrate control system which further reduces cutting tool wear under conditions of light loading between the cutting tool and the workpiece.

SUMMARY OF THE INVENTION

These objects and others are achieved, briefly, by providing a sensing unit which comprises a plurality of magnetic transducers which are connected in an AC bridge arrangement, the transducers being so disposed with respect to the machine's spindle that the bridge output is proportional to spindle deflection, and which further comprises a demodulator circuit converting the bridge output into a suitable milling force signal.

BRIEF DESCRIPTION OF THE DRAWINGS

The subject matter of this invention is particularly pointed out and distinctly claimed in the concluding portion of the specification. The invention, both as to organization and method of operation, may be best understood by reference to the following description taken in conjunction with the accompanying drawings in which:

FIG. 4 is an exploded pictorial diagram showing the structure and assembly of the improved milling force sensor;

FIG. 5 is a schematic diagram of the sensor circuit;

FIG. 6 is a coordinate diagram showing the force conventions associated with the sensor of FIG. 4;

DESCRIPTION OF A PREFERRED EMBODIMENT

Figure 1:
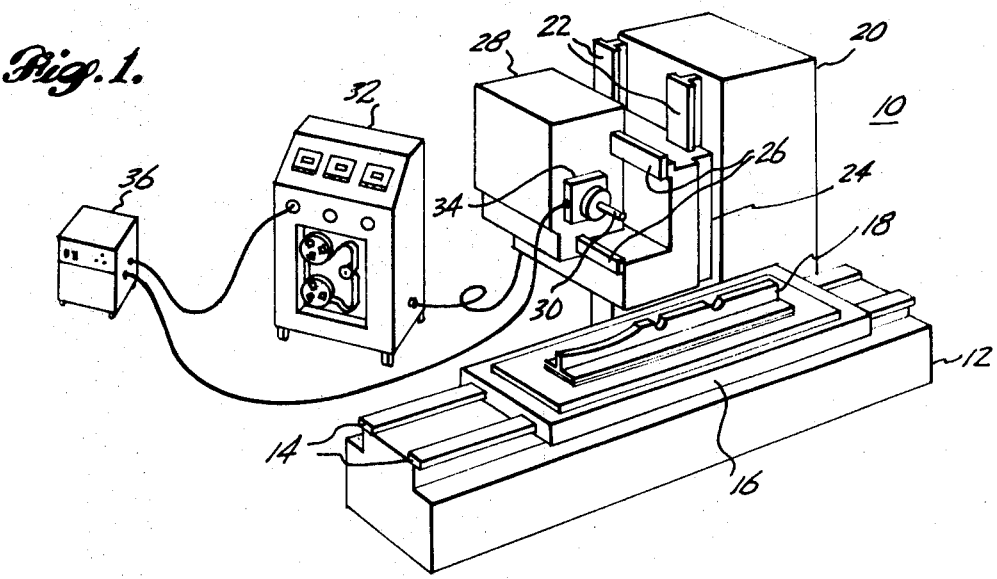
FIG. 1 is a pictorial diagram of a numerically controlled milling machine.

With reference again to FIG. 1, milling machine 10 is supplied with control signals from a numerical control or N/C unit 32. Numerical control units of this type are well known to the art and generally comprise digital computer circuits which convert the information on a preprogrammed tape into control signals for milling machine 10. Of course, for different milling operations and for different workpieces, different preprogrammed tapes are required. Included in each tape are a plurality of instructions which define the details of a machining process necessary to produce a finished workpiece of desired dimension and tolerances. One of these instructions may include the desired feedrate in the three coordinate directions throughout the milling process. It is also common for the operator to manually enter the feedrate into the numerical control unit during each step of the milling process. For purposes of illustration, only the feedrate control system hereinafter described will relate to feedrate control in the longitudinal or X-direction.

The automatic feedrate control system is provided with a sensor housing 34 which is disposed in proximity to the spindle of cutter mechanism 28. According to the teachings of this invention, the improved milling force sensor in housing 34 provides an output signal corresponding to actual milling force exerted on the spindle or cutter of the milling machine. This output signal is determined solely from spindle or cutter deflection. The output signal is furnished to a feedrate control unit 36 which in turn supplies a control signal to the N/C unit 32.

Figure 2:
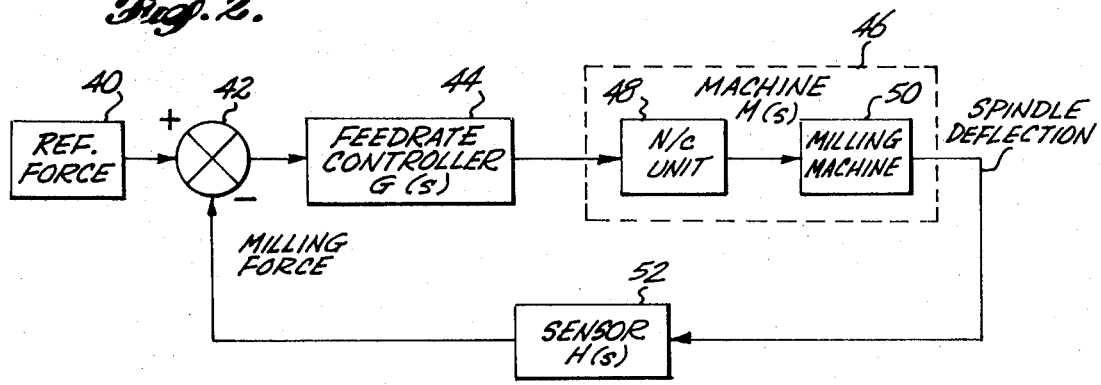
FIG. 2 is a block diagram of a feedrate control system therefore.

Now referring to FIG. 2, the system elements are shown in conventional feedback control configuration. Spindle deflection is determined by a sensor circuit 52 which may be wholly or partially disposed within sensor housing 34. Sensor circuit 52 converts the spindle deflection into a proportional milling force signal which is applied to a summing junction 42 along with a reference force signal obtained from a circuit 40.

The purpose of this comparison is to obtain an error signal which is equal to the difference between a preset reference force and actual milling force exerted on the spindle, and thus on the cutting tool. It has been discovered that control of feedrate in accordance with milling force only significantly reduces the probability of cutter breakage and undue wear while greatly increasing productivity of the machine. In addition, milling force can be easily determined by simple apparatus and techniques which require little or no modification of existing milling machines.

As is explained more fully in the aforementioned copending patent application, the reference can be closely approximated for any desired cutter configuration or material. In the simplest embodiment, circuit 40 may comprise a simple potentiometer which provides an analog voltage to the summing junction 42. The potentiometer may be set at the beginning of the machining process and thereafter the feedrate will be controlled in accordance with that preset value. Alternatively, if a plurality of different cutting operations are to be controlled by the N/C unit 32, the reference forces may be preprogrammed into the N/C tape for that particular operation, along with the other machining instructions including desired feedrate. In such cases, circuit 40 may comprise a portion of the tape reader and buffer circuits included in N/C unit 32.

The error signal appearing on the output of summing junction 42 is supplied to a feedrate controller 44. The elements of the feedback system, and especially controller 44, must have a dynamic response such as to limit the peak cutter milling forces to a value approximating that of the reference force set by circuit 40. In the simplest embodiment, feedrate controller 44 is constructed to coact with the presently used override circuits of known N/C units and therefore operates to reduce the preset feedrate when the reference force is exceeded during the milling process. This type of control is in accordance with previous automatic feedrate controls and has proved to be the most feasible from an operating and practical standpoint. However, it is also contemplated that the feedrate controller 44 be able to increase feedrate above the preset value, if the reference force is in fact not exceeded during the milling process. A further explanation of this type of control can be found in the detailed discussion of the improved feedrate controller illustrated in FIG. 7.

Figure 3:
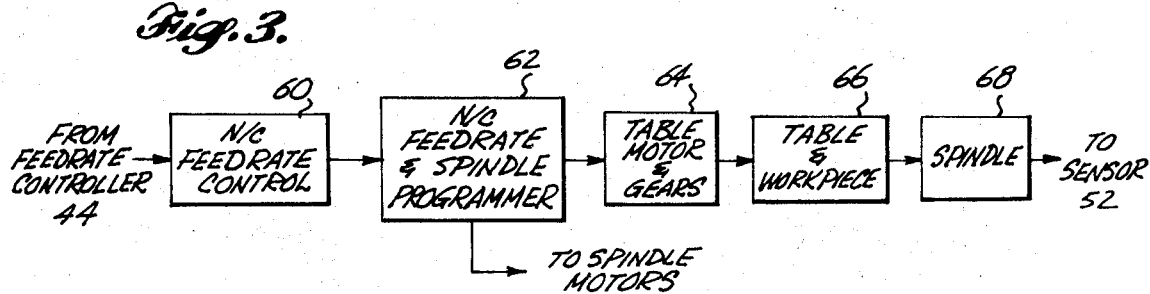
FIG. 3 is a block diagram of a portion of a typical numerically controlled milling machine.

The output of feedrate controller 44 is supplied to a milling machine block 46 which comprises an N/C control 48 and a milling machine 50. With particular reference to FIG. 3, in which milling block 46 is more completely detailed, the output from feedrate controller 44 may be applied to an N/C feedrate control circuit 60 which is disposed within N/C control 48. In existing numerical control units, external feedrate override is effected by the operator rotating a potentiometer shaft. With such a unit, circuit 60 may comprise a servomotor which rotates the shaft of that potentiometer in accordance with the magnitude and direction of the signal from feedrate controller 44.

The manual override potentiometer is usually disposed in a circuit which determines the clock frequency of the numerical control logic. The feedrate is determined in these units by dividing down, by appropriate logic circuitry, that clock frequency. Therefore, the potentiometer in circuit 60 may be operative to lower the clock frequency in proportion to the degree of shaft rotation. In a preferred embodiment of the system, the output signal from feedrate controller 44 may be connected into a logic circuit which directly controls the clock frequency, as by a variable frequency oscillator or the like.

The control signal from circuit 60 is fed to an N/C feedrate and spindle programmer circuit 62 which processes the instruction signals obtained from the preprogrammed N/C tape. These signals define the depth of cut, speed of spindle rotation, and the like. In most cases, the control signal from circuit 60 comprises the system clock pulses, and therefore controls the rate at which a logic means in programmer 62 provides speed and direction control signals to one or more of the table motors, in correspondence with the instruction signals. Programmer 62 also supplies the speed and direction control signals to the spindle motor which form no part of the feedrate control system.

The feedrate output signal from programmer 62 is applied to a table motor and gear arrangement 64. Through appropriate mechanical linkage, the table motor and gear arrangement 64 moves a table and workpiece 66 at the desired feedrate.

Until the workpiece has actually come into contact with the cutting tool of the milling machine, the feedback loop for the feedrate control system is not completed. When contact is made between the cutting tool and the workpiece, the force exerted therebetween is designated as milling force and results in the deflection of the cutting element, and thus the spindle 68 of the milling machine, from its normally centered position. This deflection may occur in the X- and Y-directions, in the Z-direction, or in all three coordinate directions. As explained previously, the resultant deflection of the spindle 68 is measured by sensor 52 whose output signal is thus proportional to actual milling force.

Since the feedback loop is not completed until the cutting element engages the workpiece, the milling process may proceed at the preprogrammed feedrate until contact is made. At that time, the feedback loop is completed and the feedrate is accordingly controlled in accordance with the deviation of actual milling force from the preset reference force.

It should be noted that the elements illustrated in FIG. 3 form no part of the instant invention. Rather, these elements merely exemplify some commonly known numerically controlled milling machines and are illustrated for purposes of explanation only. The improved feedrate controller and force sensor of this invention may be used with any feedrate system, such as that illustrated in FIG. 2, and with any milling machine, conventional or numerically controlled. Feedrate control systems of this type, and particularly the force sensor and feedrate controller, require only that the feedrate of the milling machine be externally controllable and that the machine spindle be assessible for deflection measurements.

Examples of how such a single input variable feedrate control system greatly increases machine productivity while yet being relatively inexpensive can be found in the aforementioned copending patent application. This invention is particularly concerned with an improved force sensor for achieving even greater economy of installation and operation, and with an improved feedrate controller which effectively guards against undue cutter wear under certain operating conditions.

The improved force sensor can be best understood by reference to FIGS. 4-7. With particular reference to FIG. 4, the physical details of the sensor housing 34 and some of the elements of sensor circuit 52 may be ascertained. This structure is particularly designed for use with a milling machine of the cutter drawbar type, in which a tool adapter is secured to the machine's spindle by means of a drawbar passing through the center of the spindle. In turn, the tool adapter supports a cutting tool.

The cutter mechanism 28 includes an external bearing holder 70 which supports for rotation the end of a spindle 72 extending along the transverse or Z-axis of the milling machine. Disposed at the end of spindle 72 is a relatively enlarged spindle nose portion 73 which has on a front surface thereof a plurality of projections 76 which are adapted to engage with corresponding recesses in a tool adapter. Also included in nose portion 73 is a centrally located, tapered recess 74. A cutter drawbar 78 extends throughout the length of spindle 72 and has a threaded end 79 terminating within the aperture formed by tapered recess 74.

The tool adapter may be configured like that illustrated at 80 in FIG. 4 and includes a plurality of recesses 82 which are adapted to be engaged by the plurality of projections 76 on spindle nose 73, a tapered projection 84 which is designed to cofit with the tapered recess 74, and a centrally located aperture 83 which is adapted to be threadedly engaged with end 79 of cutter drawbar 78. In turn, tool adapter 80 has any desired cutting tool 86 centrally located in an outside face thereof.

As is well known, such tool adapters are provided to accommodate fast and accurate cutting tool changes without necessity for realignment or other adjustments to the milling machine. The tapers on recess 74 and projection 84 are equivalent and may comprise, for example, a standard No. 50 machine taper. When a tool is to be attached to the spindle, it is first inserted into the tool adapter. The tool adapter is then placed into contact with spindle nose portion 73 and the cutter drawbar 78 threaded therein. After tightening, the cofitting of tapers 74 and 84 provide precise alignment of the cutting tool, and the cofitting of projections 73 and recesses 82 provides a positive drive to the cutting tool during spindle rotation.

Spindle deflection is measured, in the X- and Y-directions, by a plurality of magnetic transducers $M_1$, $M_2$, $M_3$, and $M_4$ which are disposed in a quadrature relationship around the circumference of spindle nose portion 73. In the embodiment of FIG. 4, transducers $M_1$–$M_4$ are simply bolted to a cutaway portion of the external bearing holder 70. Each transducer comprises a small airgap transformer. An AC exciting voltage is applied to the primaries of the transformers, and is coupled to the secondaries thereof via an airgap which includes in its magnetic circuit the spindle nose portion 73. As the distance between the pole faces of the windings and the spindle nose portion 73 is changed, as by deflection of the spindle nose portion when the cutting tool engages the workpiece, the magnetic reluctance of the airgap is accordingly varied to vary the voltages induced in the secondary windings.

With particular reference to FIG. 6, it can be seen that the spindle nose portion 73 is displaced a distance $D_1$ from transducer $M_1$ and a distance $d_3$ from transducer $M_3$. Assume that the cutting tool is moving relative to the workpiece in the negative Y-direction. When the cutting tool engages the workpiece, the spindle nose portion 73 is deflected upwardly. Since the transducers $M_1$ and $M_3$ are secured to the stationary spindle mechanism 28, the distance $d_1$ decreases and the distance $d_3$ increases. The secondary windings of the transducers are connected to an AC, opposing bridge arrangement. If the secondary voltages are of equal magnitude when the dimensions $d_1$ and $d_3$ are equal, then an unbalance in these voltages occurs when the cutting tool is deflected in the Y-direction. The resultant difference voltage obtained from the bridge circuit may then be used to provide a signal proportional to spindle deflection in that direction.

Particular reference should now be made to FIG. 5. An AC signal source 90 is connected across the primary windings of the transducers $M_1$–$M_4$ to provide an exciting signal thereto. Specifically, the primaries of transducers $M_1$ and $M_3$, and transducers $M_2$ and $M_4$, are connected in series-aiding relationship across source 90. The secondary windings, however, are connected in series-opposing relationship so that the common output signal therefrom represents the difference between the two induced secondary voltages. Under the conditions of balance, where the dimensions such as $d_1$ and $d_3$ are equal, the two induced secondary voltages also have an equal magnitude so that the net DC content of the AC output signal is zero.

The output signal from the secondary windings of transducers $M_1$ and $M_3$ is connected to a Y-deflection demodulator circuit 92, and the output signal from the secondary windings of transducers $M_2$ and $M_4$ is connected to an X-deflection demodulator circuit 98. As these circuits are identical, only the first will be described in detail. Specifically, Y-deflection demodulator 92 comprises a differential amplifier 93 whose output principally comprises a wave form having a frequency equal to that of source 90 which is amplitude modulated in proportion to the difference of the two secondary voltages in transducers $M_1$ and $M_3$. The function of the remaining elements in demodulator 92 is to extract this amplitude modulated component and convert it into a DC output signal, and to filter out noise and other spurious signals.

There are also exists in the output signal from differential amplifier 93 an undesired component which is a result of bearing or spindle runout, or eccentricity. If the spindle 72, spindle nose 73, or bearing 70 therefor is the least bit out of round, the circumference of spindle nose portion 73 will no traverse a perfect circle during its rotation. This traverse introduces an error component whose magnitude varies with the degree of runout and whose frequency is equal to the frequency of the oscillator, plus and minus the speed of revolution of the spindle. By connecting the output of amplifier 93 to a band-pass er 94, this error component is removed by appropriately choosing the center frequency to be equal to the oscillator frequency and by choosing bandwidth to encompass expected spindle speed variations. At low spindle speeds, the error component is not rejected as well as at higher spindle speeds. However, under the former condition the deflection of the spindle is usually large, and thus the error component is generally very small with respect to the amplitude modulated component.

The output of band-pass filter 94 is applied through an amplifier 95, which may have an amplitude gain of 10, to a demodulator circuit comprising a half wave rectifier 96 and an amplifier and low pass filter combination 97. In one embodiment, the output of half wave rectifier 96 may comprise only the positive half cycles of the amplitude modulated components. Amplifier 97 then suitably amplifies, smooths and filters the positive half cycle pulses into a DC voltage whose magnitude is proportional to the degree of deflection of the spindle nose portion 73 in the Y-direction.

A similar DC voltage is obtained from X-deflection demodulator 98 whose magnitude is proportional to the degree of deflection of spindle nose portion 73 in the X-direction between transducers $M_2$ and $M_4$. These deflection voltages are coupled to inputs of a summing amplifier 102 which has connected in the feedback loop thereof a varistor 104. The X-direction of Y-direction deflection voltages are summed to obtain a composite deflection voltage which represents the resultant deflection of the spindle nose portion 73, and thus the resultant milling force $f$ at an angle $\theta$, as indicated in FIG. 6. Strictly speaking, the X-direction and Y-direction deflection voltages should first be passed through a squaring circuit if a proportional, linear response is desired. However, the sensor circuit in FIG. 4 is designed to accentuate small deflections, and thus small milling forces, so as to increase system response to deviations from a reference force. To this end, varistor 104 is connected in a commonly known feedback configuration so that the output of summing amplifier 102 comprises the mathematical square root of the sum of the input signals thereto. Such a square root output adds sensitivity to the deflection measurement with small amounts of deflection. With greater amounts of deflection, the sensitivity is reduced over a linear response. However, since the milling forces represented by these large deflection signals are so much greater, the small loss of sensitivity does not significantly affect system response.

Figure 7:
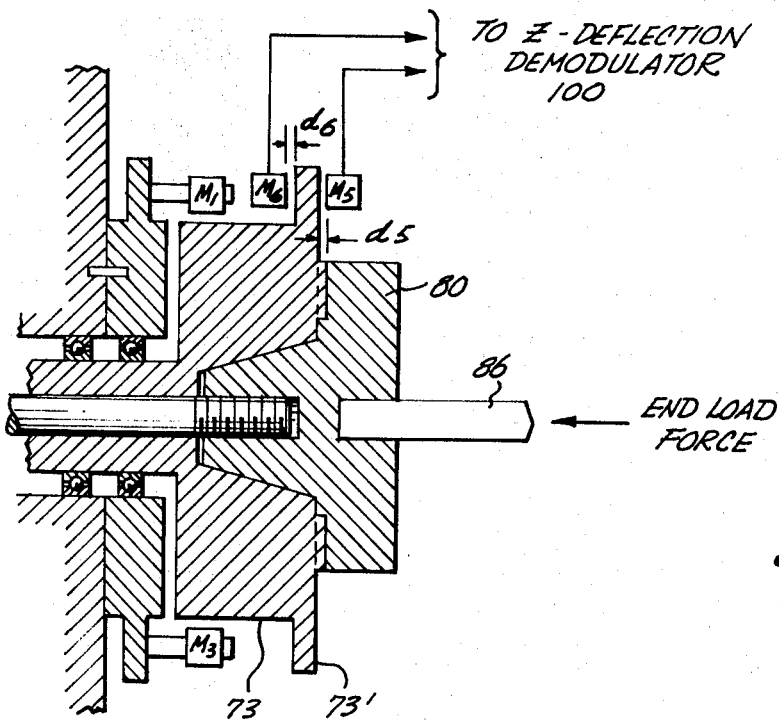
FIG. 7 is a section view of an alternate construction of the sensor illustrated in FIG. 4.

Experiments have shown that the automatic feedrate control system operates quite satisfactorily with a milling force signal obtained by summing the deflections in the X- and Y-coordinate directions. This milling force signal is, of course, proportional to the sideload exerted on the cutting tool by the workpiece. However, if further sensitivity is desired, a component may be added to the milling force signal which is proportional to end load force exerted on the cutting tool. This end load force is sensed by deflection of the spindle in the transverse, or Z-direction, in the following manner. In FIG. 7, magnetic transducers $M_5$ and $M_6$ are disposed in the Z-direction along on either side of an enlarged diameter extension 73' of spindle nose portion 73. Together with extension 73', transducers $M_5$ and $M_6$ define dimensions $d_5$ and $d_6$ which are equal or related in a known manner under conditions of zero end load force. The primary windings of transducers $M_5$ and $M_6$ are connected to the source 90, and the secondary windings thereof in series-opposing relationship to the inputs of a Z-deflection demodulator 100 which is identical in structure operation to X- and Y-deflection demodulators 92, 98. As with the sideload force measuring transducers $M_1$-$M_4$, the secondary voltages in transducers $M_5$ and $M_6$ are normally balanced. When an end load force is applied in the Z-direction to a cutting tool, and thus to extended spindle nose portion 73', dimensions $d_5$ and $d_6$ differ so that the voltages induced in the secondaries of transducers $M_5$ and $M_6$ become unequal, thereby providing a common output signal to a differential amplifier within demodulator 100. The output of this amplifier has a component whose frequency is equal to that of source 90 and which is amplitude modulated in accordance with the difference in the induced secondary voltages. The remainder of demodulator 100 converts this amplitude-modulated component into a DC voltage representative of the degree of transverse deflection, and thus the amount of the end load force. The output signal of demodulator 100 is then summed with the output signals from demodulators 98 and 92 in amplifier 102. Under certain circumstances, special circuitry may be required in demodulator 100 to compensate for normal Z-direction deflections when the spindle is rotating under conditions of zero end load force. Such a circuit could comprise, for example, a threshold device which is responsive only to deflections above a predetermined value.

In a working model, the transducers comprised Electro Products magnets No. 3080. The remaining components of the improved force sensor, as well as other design modifications, are well known to the art and no further description thereof is required.

Figure 8:
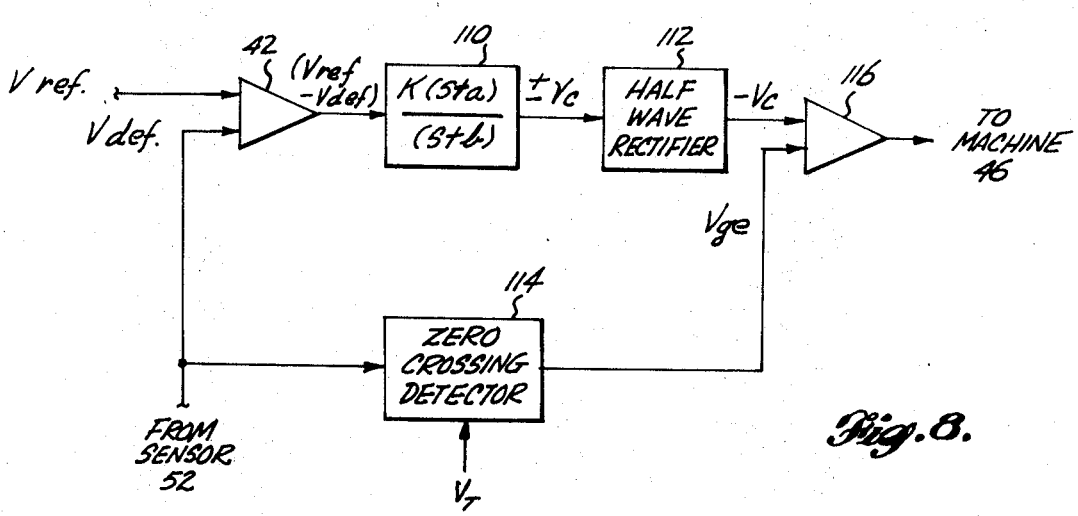
FIG. 8 is a block diagram of an improved feedrate controller.

The instant invention also contemplates an improvement in the feedrate controller 44 used in automatic feedrate control systems of this type. With specific reference to FIG. 8, the output from sensor 52, which is designated as a voltage $V_{def}$, is supplied as one input to the summing junction 42, along with a voltage $V_{ref}$ whose magnitude is proportional to the reference force and which is obtained from circuit 40. In FIG. 8, summing junction 42 comprises a summing amplifier, and the relative signal polarities of voltages $V_{ref}$ and $V_{def}$ are opposing. The output of amplifier 42 is applied to a control unit 110 which embodies a desired control function for the feedrate control system. Control unit 110 should have a transfer function of the type generally indicated in FIG. 8, which may comprise any proportional, integral or derivative function of that type. One such control function is illustrated in the aforementioned copending patent application, but it is to be clearly understood that such a function is only one of a large family possible for use in feedrate control systems. The output of control unit 110 comprises a voltage $V_c$ whose sign and magnitude denotes either an increase or decrease of machine feedrate. In automatic feedrate control systems, this voltage normally would be applied directly to the milling machine and to the numerically controlled or conventional feedrate control circuits therein. However, it has been found in practice that with automatic feedrate control systems the operator has been tempted to preprogram a feedrate which is largely in excess of that which will be encountered during the actual milling process to further increase machine productivity. Although this maneuver proves no problem when the cutting tool is fully into engagement with the workpiece, it does lead to undue wear thereof when the cutting tool is barely touching the workpiece and the resultant deflection of the cutting tool is small. In this instance, automatic feedrate control systems do not significantly reduce the feedrate below that preprogrammed, even with low deflection-sensitive sensor circuits such as that illustrated in FIG. 5. When only the edge of the cutting tool is in contact with the workpiece, the load thereon is not evenly distributed, thus resulting in internal stresses which significantly reduce tool life.

The remaining elements of FIG. 8 reduce this wear factor in the following manner. The output from sensor 52 is also applied to a zero crossing detector 114 which has set therein a threshold voltage $V_T$. $V_T$ is set quite low so that as soon as the cutting tool touches the workpiece, the voltage $V_{def}$ exceeds $V_T$. At this time, zero crossing detector 114 provides a constant DC output voltage $V_{uc}$ which is applied to the positive input of a differential amplifier 116. The voltage $V_c$ obtained from control unit 110 is applied through a half wave rectifier 112 to the negative input of differential amplifier 116. Rectifier 112 is configured so as to pass only the negative portions of the control signal $V_c$. The output of differential amplifier 116 may be connected directly to the machine block 46 and to the feedrate control circuits therein.

In operation, the cutting tool is initially moved relative to the workpiece at the preprogrammed feedrate. As soon as the cutting tool engages the workpiece, $V_{def}$ exceeds $V_T$ and zero crossing detector 114 provides the output voltage $V_{oe}$ to amplifier 116. At small deflections, $V_{def}$ is less than $V_{ref}$, and thus the output of control unit 110 is a positive voltage $V_c$ which is blocked from the input of differential amplifier 116 by half wave rectifier 112. Accordingly, the signed applied to machine block 46 is $V_{oe}$. The magnitude of this voltage is chosen to reduce the feedrate to one-half the preprogrammed value. Therefore, when the cutting tool is barely in engagement with the workpiece, the feedrate is halved to reduce the shock of impact and thus to reduce wear caused by an unduly high preprogrammed feedrate. As the cutting tool comes into further contact with the workpiece, $V_{def}$ increased. When $V_{def}$ exceeds $V_{ref}$ the output of control unit 110 is a negative control voltage $V_c$ which is applied through half wave rectifier 112 to amplifier 116. After inversion, this voltage is summed with the voltage $V_{oe}$ to provide an increased control signal to machine block 46, thereby further reducing the feedrate in proportion to the milling force signal from sensor circuit 52.

I CLAIM:

1. A force sensor which converts deflection of a milling machine spindle into a proportional milling force signal for use with a feedrate control system responsive thereto, including:
   a. first and second magnetic transducer means, each transducer means including a winding,
   b. means supporting said first and second transducer means in proximity to the circumference of the spindle but opposed along a diameter thereof,
   c. an alternating current source coupled to said windings,
   d. means connecting said windings in opposition, whereby a common output signal thereof includes a component having a frequency equal to that of said AC source which is amplitude modulated in accordance with the relative deflection of the spindle along said diameter, and
   e. a demodulating means converting said amplitude modulated component into a DC milling force signal.

2. A sensor as recited in claim 1 wherein said demodulating means comprises:
   a. a differential amplifier having said common output signal connected thereto,
   b. a band-pass filter means removing from the output of said differential amplifier components thereof which have a frequency other than that of said AC source, and
   c. a demodulator circuit extracting said amplitude-modulated component and producing therefrom said DC milling force signal.

3. A sensor as recited in claim 2 wherein said demodulator circuit comprises means rectifying a half cycle of said amplitude-modulated component and means filtering said rectified, amplitude-modulated component, and wherein said demodulating means further comprises an amplifier interposed between said band-pass filter and said demodulator circuit.

4. A force sensor as recited in claim 1 further comprising:
   a. third and fourth magnetic transducer means, each including a winding,
   b. means supporting said third and fourth transducer means in proximity to the circumference of the spindle but opposed along a second diameter thereof which is perpendicular to said first diameter,
   c. said AC source being coupled to said windings of said third and fourth transducers,
   d. means connecting said windings of said third and fourth transducer means in opposition whereby a common output signal is provided therefrom,
   e. a second demodulating means having a second common output signal connected thereto and producing therefrom a second DC milling force signal, and
   f. means summing said first and second DC milling force signals to produce a common DC milling force signal.

5. A sensor as recited in claim 4 wherein said demodulating means comprises:
   a. a differential amplifier having said common output signal connected thereto,
   b. a band-pass filter means removing from the output of said differential amplifier components thereof which have a frequency other than that of said AC source, and
   c. a demodulator circuit extracting said amplitude-modulated component and producing therefrom said DC milling force signal.

6. A sensor as recited in claim 5 wherein the said demodulator circuit comprises means rectifying a half cycle of said amplitude-modulated component and means filtering said rectified, amplitude-modulated component, and wherein said demodulating means further comprises an amplifier interposed between said band-pass filter and said demodulator circuit.

7. A force sensor as recited in claim 6 wherein said summing means comprises a nonlinear circuit giving increased sensitivity for small amounts of milling force.

8. A force sensor as recited in claim 4, as modified to additionally monitor deflection of the machine spindle along its axis where the spindle includes a relatively enlarged portion comprising:
   a. fifth and sixth magnetic transducer means, each including a winding,
   b. means supporting said fifth and sixth transducer means in proximity to the relatively enlarged spindle portion and disposed along a line parallel to the axis,
   c. means coupling said windings of said fifth and sixth transducer means to said AC source, and means connecting said windings thereof in opposition to provide a common output signal therefrom which includes a component having a frequency equal to that of said AC source which is amplitude modulated in accordance with the relative deflection of the spindle along said parallel line,
   d. a third demodulating means converting the amplitude modulated component of said common output signal into a third DC milling force signal, and
   e. means coupling said third DC milling force signal to said summing means.

9. In a system for use with a numerically controlled milling machine including a rotatable spindle and a numerical control unit including apparatus for receiving a preprogrammed tape defining the details of a milling process, one of the details being a preset feedrate and a feedrate override means controllable to reduce the feedrate below the preset value which comprises a sensor means measuring spindle deflection and producing therefrom a signal proportional to milling force exerted on the cutting element held by the spindle during the milling process, a means providing a reference force signal, means summing the reference force signal with the milling force signal to provide an error signal equal to the difference therebetween, and a controller means which produces a control signal from the error signal when the milling force signal exceeds the reference force signal, the control signal being coupled to the feedrate override means to reduce the feedrate in proportion thereto, an improvement in the force sensor comprising:
   a. a plurality of magnetic transducers disposed about the periphery of the machine spindle,
   b. a source of exciting voltage coupled to said plurality of magnetic transducers,
   c. means connecting said transducers in an AC bridge which provides a common output signal including an amplitude modulated component proportional to the deflection of the spindle from a normally centered position, and
   d. means demodulating the common output signal to produce a milling force signal therefrom.

10. In a system for use with a numerically controlled milling machine including a rotatable spindle and a numerical control unit including apparatus for receiving a preprogrammed tape defining the details of a milling process, one of the details being a preset feedrate and a feedrate override means controllable to reduce the feedrate below the preset value which comprises a sensor means measuring spindle deflection and producing therefrom a signal proportional to milling force exerted on the cutting element held by the spindle during the milling process, a means providing a reference force signal, means summing the reference force signal with the milling force signal to provide an error signal equal to the difference therebetween, and a controller means which produces a control signal from the error signal when the milling force signal exceeds the reference force signal, the control signal being coupled to the feedrate override means to reduce the feedrate in proportion thereto, an improved controller comprising:

a. a control unit operating on the error signal with a predetermined control function to produce a DC control signal therefrom, b. a comparator means having said milling force signal connected thereto and providing an output signal when said signal exceeds a predetermined threshold value, c. means rectifying said DC control signal, d. a differential amplifier having said rectified DC control signal and said output signal from said comparator means connected thereto, the output of said differential amplifier being coupled to the feedrate override circuit as a feedrate control signal, and the magnitude of said output signal being chosen to reduce feedrate to a predetermined value less than the preset value.